US007949219B1

(12) United States Patent
Karras

(10) Patent No.: US 7,949,219 B1
(45) Date of Patent: May 24, 2011

(54) SELF FORMING WAVEGUIDES FOR OPTICAL COUPLING AND METHODOLOGIES FOR MAKING SAME

(75) Inventor: Thomas W. Karras, Berwyn, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 41 days.

(21) Appl. No.: 12/398,967

(22) Filed: Mar. 5, 2009

Related U.S. Application Data

(60) Provisional application No. 61/039,047, filed on Mar. 24, 2008, provisional application No. 61/039,088, filed on Mar. 24, 2008.

(51) Int. Cl.
*G02B 6/26* (2006.01)

(52) U.S. Cl. .................................................. 385/50

(58) Field of Classification Search .................... 385/50, 385/15

See application file for complete search history.

(56) References Cited

U.S. PATENT DOCUMENTS 6,663,297 B1 * 12/2003 Goldstein ........................ 385/97
6,925,233 B2 * 8/2005 Inui et al. ........................ 385/39
6,932,880 B2 * 8/2005 Inui et al. .................. 156/272.2
7,356,226 B2 * 4/2008 Watanabe ........................ 385/43
7,641,821 B2 * 1/2010 Oe et al. ........................ 264/1.25
7,734,125 B2 * 6/2010 Kodama et al. ................. 385/14
2007/0054222 A1 3/2007 Gorczyca et al.

FOREIGN PATENT DOCUMENTS

JP 2008046178 * 2/2008
WO WO 2007/030272 A2 3/2007

OTHER PUBLICATIONS

Kung-Li Deng, et al., "Self-Aligned Single-Mode Polymer Waveguide Interconnections for Efficient Chip-to-Chip Optical Coupling," IEEE Journal of Selected Topics in Quantum Electronics, vol. 12, No. 5, Sep./Oct. 2006.

* cited by examiner

*Primary Examiner* — Ryan Lepisto
*Assistant Examiner* — Eric Wong
(74) *Attorney, Agent, or Firm* — McDermott Will & Emery LLP

(57) ABSTRACT

Systems and methods of forming an optical coupling between two optical waveguides where at least one of the optical waveguides is non-UV transmissive are disclosed. In one aspect, a self-forming waveguide (SFWG) is formed in a photosensitive material disposed between a UV transmissive optical waveguide and a non-UV transmissive component at least in part by a portion of an incident UV beam reflected from an interface between the photosensitive material and the non-UV transmissive material. In another aspect, two separate SFWG waveguides are formed in two separate photosensitive materials by UV beams passed thereto via a UV transmissive bridge waveguide.

13 Claims, 4 Drawing Sheets

SELF FORMING WAVEGUIDES FOR OPTICAL COUPLING AND METHODOLOGIES FOR MAKING SAME

CROSS-REFERENCE TO RELATED APPLICATIONS

This application claims priority from U.S. Provisional Patent Application No. 61/039,047, filed on Mar. 24, 2008, and also from U.S. Provisional Patent Application No. 61/039,088, filed on Mar. 24, 2008, which are both incorporated herein by reference.

STATEMENT REGARDING FEDERALLY SPONSORED RESEARCH OR DEVELOPMENT

The U.S. Government has a paid-up license in at least part of this invention and the right in limited circumstances to require the patent owner to license others on reasonable terms as provided for by the terms of Contract No. F33615-01-2-1843 awarded by the United States Air Force.

FIELD

The present disclosure generally relates to waveguides and, in particular, relates to self forming waveguides for providing coupling between optical waveguides where at least one of the optical waveguides is non-UV transmissive.

BACKGROUND

Low-loss Self Forming Waveguide (SFWG) coupling of two different optical elements such as waveguides that are closely spaced can be accomplished with UV-photosensitive polymers irradiated with ultraviolet (UV) light. Coupling between two optical fibers or between a fiber and a glass waveguide can be accomplished by proper insertion of the photosensitive polymer between them, alignment of the optical waveguides and passage of UV through both of those waveguides. A methodology for forming such a SFWG for coupling two optical elements is described in Kung-Li Deng, et al., "Self-aligned Single-Mode Polymer Waveguide Interconnections for Efficient Chip-to-chip Optical Coupling", IEEE Journal of Selected Topics in Quantum Electronics, Vol. 12, No. 5, September/October 2006, which is incorporated by reference herein in its entirety. In the Kung-Li reference, UV light is passed through both waveguides into the photosensitive polymer. Therefore, the prior art methodology relies on both waveguides being UV transmissive. It was believed that UV coming only from one waveguide would not be able to "find" the second waveguide without exceptional alignment, and that the resulting waveguide would spread, resulting in poor coupling. This two-sided UV passage methodology cannot be used to form a SFWG when one or both of the optical elements (e.g., waveguides) to be coupled is non-UV transmissive, e.g., not made of a UV transmitting material or otherwise incapable of supporting UV light transmission.

In view of the foregoing, there exists a need for improved approaches and methodologies for producing SFWGs suited for coupling optical elements where at least one of the optical elements is non-UV transmissive.

SUMMARY

In one aspect, a self-forming waveguide (SFWG) is formed in a photosensitive material disposed between a UV transmissive optical waveguide and a non-UV transmissive component at least in part by a portion of an incident UV beam reflected from an interface between the photosensitive material and the non-UV transmissive material. In another aspect, two separate SFWG waveguides are formed in two separate photosensitive materials by UV beams guided thereto by a UV transmissive bridge waveguide.

Certain embodiments provide a method for forming an optical coupling element between a UV transmissive optical waveguide and a non-UV transmissive optical waveguide. The method can comprise passing an incident ultraviolet (UV) beam through the UV transmissive optical waveguide into a photosensitive material disposed between the UV transmissive optical waveguide and the non-UV transmissive optical waveguide. The method can further comprise forming a self-forming waveguide (SFWG) in the photosensitive material at least in part by a portion of the incident UV light beam reflected from an interface between the photosensitive material and the non-UV transmissive optical waveguide.

Certain embodiments provide a coupled optical system comprising a UV transmissive optical waveguide and a non-UV transmissive optical waveguide. The coupled optical system can further comprise a self-forming waveguide (SFWG) disposed between the UV transmissive optical waveguide and the non-UV transmissive optical waveguide. The SFWG can comprise an inner region and an outer region surrounding at least part of the inner region. The inner region has a higher refractive index than the outer region.

Certain embodiments provide a method for forming an optical coupling element between a first non-ultraviolet (UV) transmissive optical waveguide and a second non-UV transmissive optical waveguide. The method can comprise providing a bridge waveguide between the first non-UV transmissive optical waveguide and the second non-UV transmissive optical waveguide. The method can further comprise providing a first photosensitive material between the bridge waveguide and the first optical waveguide. The method can further comprise providing a second photosensitive material between the bridge waveguide and the second optical waveguide. The method can further comprise coupling an incident UV beam into the bridge waveguide to form a first UV beam and a second UV beam travelling therein. The method can further comprise forming a first self-forming waveguide (SFWG) in the first photosensitive material by at least a portion of the first UV beam passing into the first photosensitive material. The method can further comprise forming a second SFWG in the second photosensitive material by at least a portion of the second UV beam passing into the second photosensitive material.

Certain embodiments provide a coupled optical system comprising a first non-ultraviolet (UV) transmissive optical waveguide and a second non-UV transmissive optical waveguide. The coupled optical system can further comprise a UV transmissive bridge comprising a bridge waveguide disposed between the first and second optical waveguides. The coupled optical system can further comprise a first self-forming waveguide (SFWG) disposed between the bridge waveguide and the first optical waveguide. The first SFWG can comprise a first inner region and a first outer region surrounding at least part of the first inner region. The first inner region has a higher refractive index than the first outer region. The coupled optical system can further comprise a second SFWG disposed between the bridge waveguide and the second optical waveguide. The second SFWG can comprise a second inner region and a second outer region surrounding at least part of the second inner region. The second inner region has a higher refractive index than the second outer region.

It is to be understood that both the foregoing summary and the following detailed description are exemplary and explanatory and are intended to provide further explanation of the embodiments as claimed.

BRIEF DESCRIPTION OF THE DRAWINGS

The accompanying drawings, which are included to provide further understanding of the invention and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the disclosed and claimed embodiments. It will be apparent, however, to one ordinarily skilled in the art that the embodiments may be practiced without some of these specific details. In other instances, well-known structures and techniques have not been shown in detail to avoid unnecessarily obscuring the disclosure. The word "exemplary" is used herein to mean "serving as an example, instance, or illustration." Any embodiment or design described herein as "exemplary" is not necessarily to be construed as preferred or advantageous over other embodiments or designs.

The embodiments of the present disclosure address and solve problems of conventional methodology of forming a SFWG which normally can be employed only as between two UV transmissive optical waveguides. The embodiments of the present disclosure provide methodologies that are capable of forming one or more SFWGs for coupling optical waveguides even if one or both of the optical waveguides are non-UV transmissive. The methodologies include forming a SFWG between a UV-transmissive optical waveguide and a non-UV transmissive optical waveguide by passing UV light to a photosensitive polymer disposed between the optical waveguides only through the UV transmissive waveguide. The methodologies further include forming a SFWG between two non-UV transmissive optical waveguides by passing UV light to photosensitive polymers via a UV transmissive bridge.

Additional advantages and aspects of the present disclosure will become readily apparent to those skilled in the art from the following detailed description, wherein embodiments of the present methodologies are shown and described, simply by way of illustration of the best mode currently contemplated for practicing the methodologies described herein. As will be described, the present disclosure is capable of other and different embodiments, and its several details are susceptible of modification in various obvious respects, all without departing from the spirit of the present disclosure. Accordingly, the drawings and description are to be regarded as illustrative in nature, and not as limitative.

Forming a SFWG Between A UV Transmissive Optical Waveguide and A Non-UV Transmissive Optical Waveguide Certain exemplary embodiments directed to forming a SFWG between a UV transmissive optical waveguide and a non-UV transmissive optical waveguide are now described.

Figure 1:
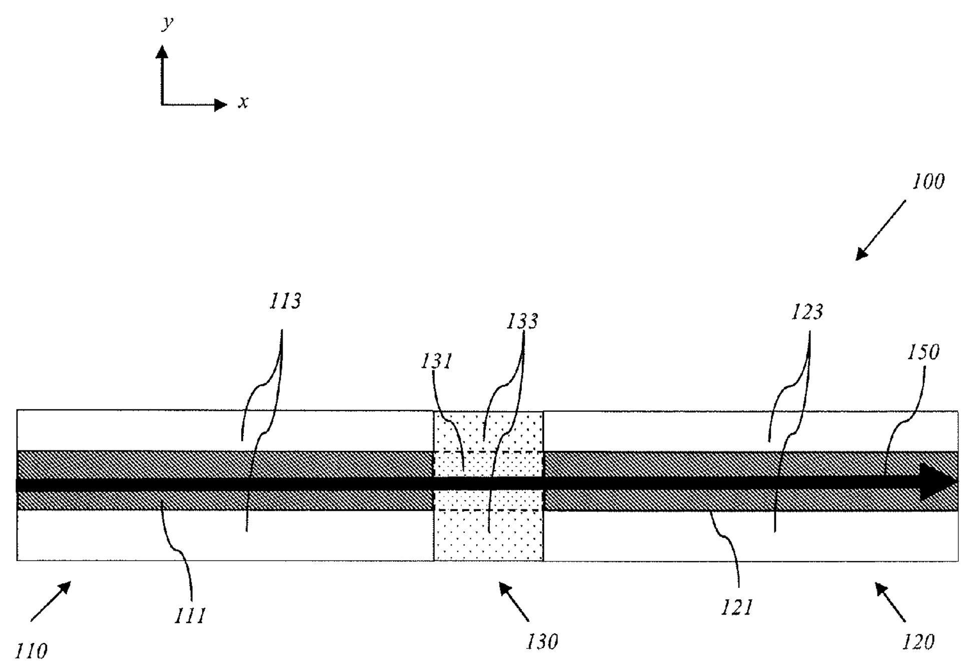
FIG. 1 is a cross-sectional view of an exemplary coupled optical system comprising a UV transmissive optical waveguide coupled to a non-UV transmissive optical waveguide by a self-forming waveguide (SFWG)

FIG. 1 is a cross-sectional view of an exemplary coupled optical system 100 comprising a UV transmissive optical waveguide and a non-UV transmissive optical waveguide. The coupled optical system 100 includes a first optical waveguide 110, a second optical waveguide 120, and a self-formed waveguide (SFWG) 130 providing an optical coupling between the two optical waveguides 110, 120, such that, for example, an optical signal 150 can pass from the first optical waveguide 110 to the second optical element 120 with a minimum loss. For illustration purposes, it is assumed that the first optical waveguide 110 is UV transmissive while the second optical waveguide 200 is non-UV transmissive.

The two optical waveguides 110, 120 can be disposed at a certain separation distance (e.g., in the x direction) that may be in the range of from about 10 microns to about 2 millimeters. For example, a SFWG-based optical coupling can be achieved with the original waveguides separated by only a few tens or hundreds of microns, allowing for very compact architectures. The separation distance, hence the width of the SFWG 130, in the x-direction is preferably between about 10 microns to about 100 microns.

In the illustrated example, the first and second optical waveguides 110, 120 are crystalline or semiconductor waveguides or fibers, that are substantially transmissive at one or more wavelengths for which they are intended for normal operation (e.g., at the wavelength of the optical signal 150). However, in certain embodiments, one or both of the optical waveguides being coupled may be optical devices including, but not limited to, electro-absorption modulators (EAMs), lasers, and filters. Consequently, some of the optical devices may employ non-UV transmissive waveguides therein. Regardless of the choice of the optical waveguides, one of the optical waveguides being coupled by the SFWG 130 is UV transmissive while the other is non-UV transmissive. As used herein, an optical waveguide (e.g., silica or semiconductor waveguides, or components/devices with such waveguides) is "UV transmissive" if the optical waveguide can pass through light energy in the UV spectrum (e.g., having a wavelength in the range of 200 nm-400 nm) without a substantial loss due to, for example, attenuation, absorption, or leakage.

The first optical waveguide 110 includes a core region 111, and a cladding region 113 that surrounds the core region 111. Similarly, the second optical waveguide 120 includes a core region 121 and a cladding region 123 that surrounds the core region 121. The core and cladding regions of each conductor differ in refractive index such that light energy may be confined and efficiently transmitted through the respective core region by refraction from the surrounding cladding region.

It should also be noted that the relative sizes and dimensions illustrated in FIG. 1 and the following figures are not to scale. That is, a core region of an optical waveguide may range, for example, between 3 microns and 10 microns. The surrounding cladding layer is typically much thicker, on the order of 125 microns. The sizes of optical waveguides may be dictated, at least in part, by the particular application for and the material making up the waveguide. For example, in single-mode transmission applications involving silica, extremely small waveguides may be used, having core regions on the order of 9 microns in diameter.

Although the first and second optical waveguides 110, 120 are shown in FIG. 1 to have the same diameter, the two optical waveguides may have different diameters. As will be described below, the use of certain embodiments of SFWGs described herein can reduce loss when light signal travels from an optical waveguide having a larger core to an optical waveguide having a smaller core. In some embodiments, the cladding regions 113, 123 may include two or more concentric cladding regions having different refractive indices.

The SFWG 130 may include two regions, i.e., inner and outer regions 131, 133, wherein the inner region 131 is aligned with the core regions 111, 121 of the optical waveguides 110, 120, while the outer region 133 is aligned with the cladding regions 113, 123 of the optical waveguides. For optical confinement, the refractive index in the inner region 131 is made to be higher than the refractive index of the outer region 133. As will be described below with respect to FIG. 2, this is generally accomplished by exposing a photosensitive material to UV illumination. In certain embodiments, the photosensitive material can include a polymerized binder material having a compatible, high-mobility, reactive monomer component and a photo catalyst. A variety of photosensitive materials that can be used and different methods of forming SFWGs therefrom are disclosed in U.S. Patent Application Publication No. US2007/0054222, which is incorporated herein by reference in its entirety.

Exposing a small portion of the composite material to light (e.g., UV light), appropriate to activate the catalyst, can polymerize monomers decreasing the local concentration of monomers in the UV exposed region, thus, setting up diffusion of additional monomers from the surrounding unexposed areas into the UV exposed region. Diffusion of the monomers and their subsequent polymerization change the composition of the original composite material in the exposed regions, providing regions having different refractive indices. If the chosen reactive monomer has a refractive index higher than the polymer binder, then localized catalyst activation by light exposure and subsequent monomer diffusion can result in a higher refractive index region, such as the region 131 shown in FIG. 1, being formed and, thus, lead to the possibility of forming a SFWG, such as the SFWG 130, for coupling two optical waveguides and passing an optical signal (e.g., the optical signal 150) from one optical waveguide to the other with exceptionally small (e.g., 0.5 dB) losses. In one experimental embodiment, a coupling loss as small as 0.2 db was demonstrated.

A variety of mixtures comprising different polymer/monomer combinations may be used. In certain embodiments, the mixture can include an acrylic copolymer binder blended with a cycloaliphatic diepoxide monomer. This epoxy type provides an excellent environmental robustness, is compatible with many polymer systems, has excellent optical transmission properties, and can be cured through a cationic mechanism with UV initiated catalysts. The acrylic binder used is a copolymer of methyl methacrylate (MMA) and tetrafluoropropyl methacrylate (TFPMA), with the ratio of the two components chosen such that the refractive index of the polymer is approximately 1.47 at 850 nm. At the same wavelength, the cured epoxy component has a refractive index of 1.51, significantly higher than that of the polymer binder. A composite mixture of the two materials will have a bulk refractive index that depends on quantity and refractive index (n) of the cured components according to the following equation:

$$n_{composite}=\Sigma_i\%\ \text{Component}_i \times n_i \quad (1)$$

Formation of a waveguide through the bulk material can require local curing of the epoxy content and subsequent diffusion of uncured epoxy component from the surrounding areas into the monomer-deficient cured area. This higher epoxy concentration in the cured area increases its refractive index, resulting in waveguide formation. The extent of curing, and thus the refractive index of the region may be controlled by the time of exposure to the UV radiation. Once the diffusion is complete, a blanket UV exposure may be used to cure the remaining epoxy, fixing the waveguide in place and providing a robust crosslinked patch between components.

In certain embodiments, a photosensitive composite material can be prepared by blending the binder and the epoxy together. This is typically done by dissolving the copolymer to a high solids content in a suitable solvent, adding the desired amount of cycloaliphatic epoxy, UV curing catalysts and any antioxidants or other components required, and filtering the mixture, generally through a 1-μm absolute or lower filter. The mixture is degassed and the material dispensed between the two components. Removal of solvent may be required prior to curing the mixture, and this can be done under vacuum at low temperatures, usually less than 70° C. Once the solvent is removed, a clear, transparent, glassy bulk composite material remains, which can then be photocured.

Figure 2:
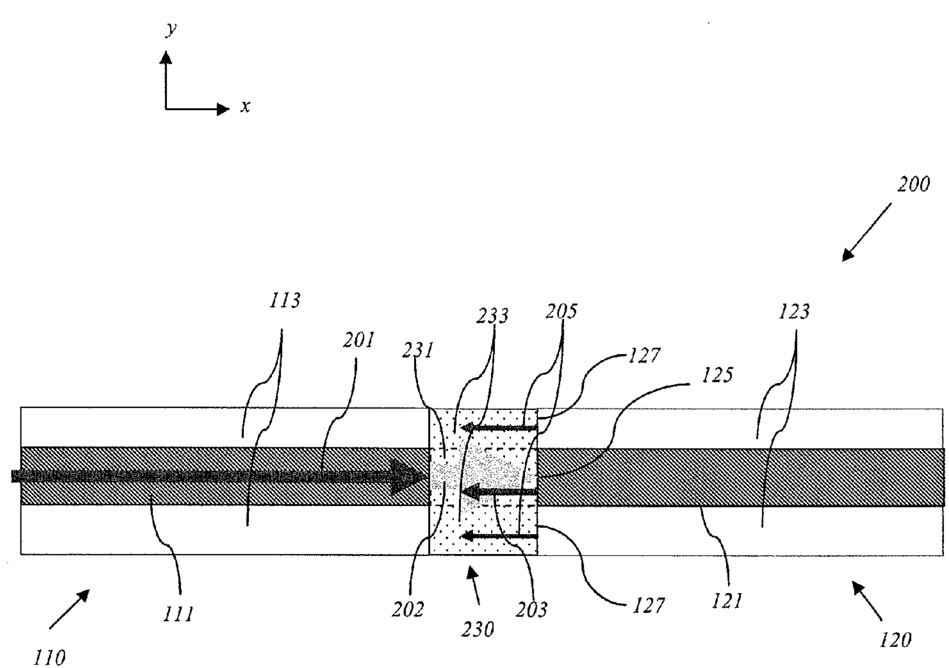
FIG. 2 is a cross-sectional view of an exemplary coupled optical system illustrating formation of a SFWG by one-sided UV illumination according to certain embodiments.

A new and novel methodology that allows for formation of a SFWG between a UV transmissive optical waveguide and a non-UV transmissive optical waveguide based on one-sided UV illumination is now described. As described above, prior art methodologies for forming SFWG optical couplings involved the illumination of a photosensitive polymer from both of two previously-aligned waveguides. Therefore, the prior art methodologies based on two-sided UV illumination cannot be used to form an optically coupled system, such as the coupled optical system 100 shown in FIG. 1, in which one of the optical waveguides desired to be coupled is non-UV transmissive. FIG. 2 is a cross-sectional view of an exemplary coupled optical system 200 illustrating formation of a SFWG, such as the SFWG 130 shown in FIG. 1, between a UV transmissive optical waveguide and a non-UV transmissive component by one-sided UV illumination according to certain embodiments. The coupled optical system 200 is substantially the same as the coupled optical system 100 illustrated by FIG. 1 except that a coupling element such as the SFWG 130 is being formed in a photosensitive material 230 by UV illumination.

In the illustrated example, an incident UV beam 201 passes through the first (UV transmissive) optical waveguide 110 into the photosensitive material 230 bounded by the first optical waveguide 110 and the second (non-UV transmissive) optical waveguide 120. As before, the second optical waveguide 120 includes the core region 121 and the cladding region 123. The second optical waveguide 220 also includes a first or inner facet 125 and a second or outer facet 127 which constitute boundaries or interfaces between the core region 121 and the cladding region 123 with respect to the photosensitive material 230, respectively. In certain embodiments, the photosensitive material 230 may comprise a composite mixture comprising a polymer and a monomer as discussed above. In some of such embodiments, the mixture can include an acrylic copolymer binder blended with a cycloaliphatic diepoxide monomer.

Initially, the incident UV beam 201 diverges after entering the photosensitive material 230 to form a diverged UV beam 202; and the diverged UV beam 202 is reflected at both the first and second facets 125, 127 to form an inner reflected UV beam 203 and an outer reflected UV beam 205. The inner reflected UV beam 203, in particular, is used as a secondary UV beam for writing the SFWG. To put it differently, the reflection at the facet 225 creates the secondary UV beam that could have been passed into the photosensitive material from the second optical waveguide 120 to form the SFWG had the second optical waveguide 120 been UV transmissive. In one aspect, this methodology is based on the realization that since the UV power level required to write the waveguide in the photosensitive polymer is only a few microwatts, reflection from a facet of the non-UV transmissive waveguide can be used to provide the secondary UV waveguide writing beam.

The inner reflected UV beam 203 polymerizes at least a portion of the photosensitive material 230 in its path to "write" the waveguide.

Because the core region 121 has a higher refractive index than the cladding region 123, the inner reflected UV beam 203 has a higher intensity than the outer reflected UV beam 205. Because of this difference in intensity of the reflected UV beams 203, 205, two different regions, i.e., a first or inner region 231 and a second or outer region 233, are formed inside the photosensitive material 230 after a short exposure to the reflected UV beams 203, 205, typically in the range of a fraction of a second to several seconds (depending on the intensity of the incident UV light). The inner region 231 thus formed has a higher refractive index than the outer region 233. This is due in part to the fact that the photosensitive material in the inner region 231 receives a higher amount of UV illumination than the photosensitive material in the outer region 233, and consequently, a higher percentage of monomers in the inner region 231 experiences a polymerization. The difference in the population of the remaining monomers causes a net diffusion or migration of monomers from the outer region 233 to the inner region 231, thereby increasing the refractive index in the inner region 231 relative to the outer region 233. In sum, the difference in refractive index of the core region 121 and the cladding region 123 provides the different intensities in the reflected UV beams 203, 205 which in turn form inner and outer regions of different refractive indices required of a waveguide, such as, for example, the SFWG 110 of FIG. 1.

As confirmed by several experimental embodiments, a new SFWG optical coupling element can be formed in a photosensitive polymer by the single-sided UV illumination methodology described above. According to one experimental embodiment, a SFWG was formed between a 9 μm core optical fiber as input and a 3 μm core fiber as output. Both were cleaved straight, so there was no focusing. The optical fibers were mounted in V-grooves and manually aligned, using 1550 nm radiation, to within 1 μm radially and 100 μm axially. The photosensitive polymer was then placed between the fiber tips and then the one-sided UV process described above was applied. The results were as follows: Power leaving 9 μm core fiber and measured at power meter before coupling=1 mw. Power leaving 3 μm core fiber and measured at power meter after coupling=500-600 μw. Coupling loss of 3 μm core and 9 μm core fiber to power meter=1 dB. This corresponds to a coupling loss in going from the 9 to the 3 μm fiber of 2.2 to 3 dB. Previous measurements have shown that light passing from the small core fiber to the large core fiber involved optical loss of <1 dB. Power coupled in without the polymer SFWG was down 9 dB from the above.

Assuming a power distribution of $\{\exp(-(r/z)^2\}$ where z is 4.5 μm, the power ratio within a radius of 1.5 μm to that within 4.5 μm is 0.17. That is, one would expect a 3 μm fiber to capture a fraction of 0.17 of that emerging from a 9 μm fiber: down by 7.7 dB not 2-3 dB. Obviously the coupling process improves things considerably. This confirms that a tapered SFWG can be formed between the two optical fibers of different radii. Such a tapered SFWG can reduce losses due to a size mismatch between optical waveguides.

Measurements have shown that an AR-coated facet of an electro-absorption modulator (EAM), which is non-UV transmissive, could not be used to form an effective waveguide in the photosensitive polymer with one sided illumination, while an EAM with a non AR coated facet could. After application of the UV, the optical power transmitted between a fiber and an AR coated EAM went down from the free space value by 87%, while the optical power transmitted between a fiber and a non-AR coated EAM went up by 18%. To validate this, the EAM facets involved were tested for materials that would be present in an AR coating. The EAM that had reduced transmission after UV application had AR coating material while which had improved transmission did not. The latter showed a fiber to fiber EAM insertion loss of only 4.2 dB, the lowest on record. These findings confirm that the SFWG is formed at least in part by a reflected UV beam. Similar measurements with AR coated and non-AR coated optical fibers confirmed the importance of using non-AR coated waveguides on one sided SFWG formation.

Forming SFWGs Between Two Non-UV Transmissive Optical Waveguides

Certain exemplary embodiments directed to forming SFWGs between two non-UV transmissive optical waveguides are now described. A bridge element with an integral waveguide is employed between two non-UV transmissive optical waveguides to deliver UV light to two layers or slabs of photosensitive materials disposed between the bridge and the optical waveguides. This waveguide within the bridge element (hereafter referred to as the "bridge waveguide") is transmissive for the wavelengths intended to propagate between the two optical waveguides. More pertinently for the present disclosure, the bridge waveguide is UV transmissive. Furthermore, the UV transmissive bridge waveguide (hereinafter the "UV bridge") can have a UV input port on its side that allows entrance of a UV beam and a set of turning mirrors right after that port that can direct or guide the UV beam through the port and then into the bridge waveguide in opposite directions, while still allowing straight through transmission between the optical waveguides for longer wavelengths.

Figure 3:
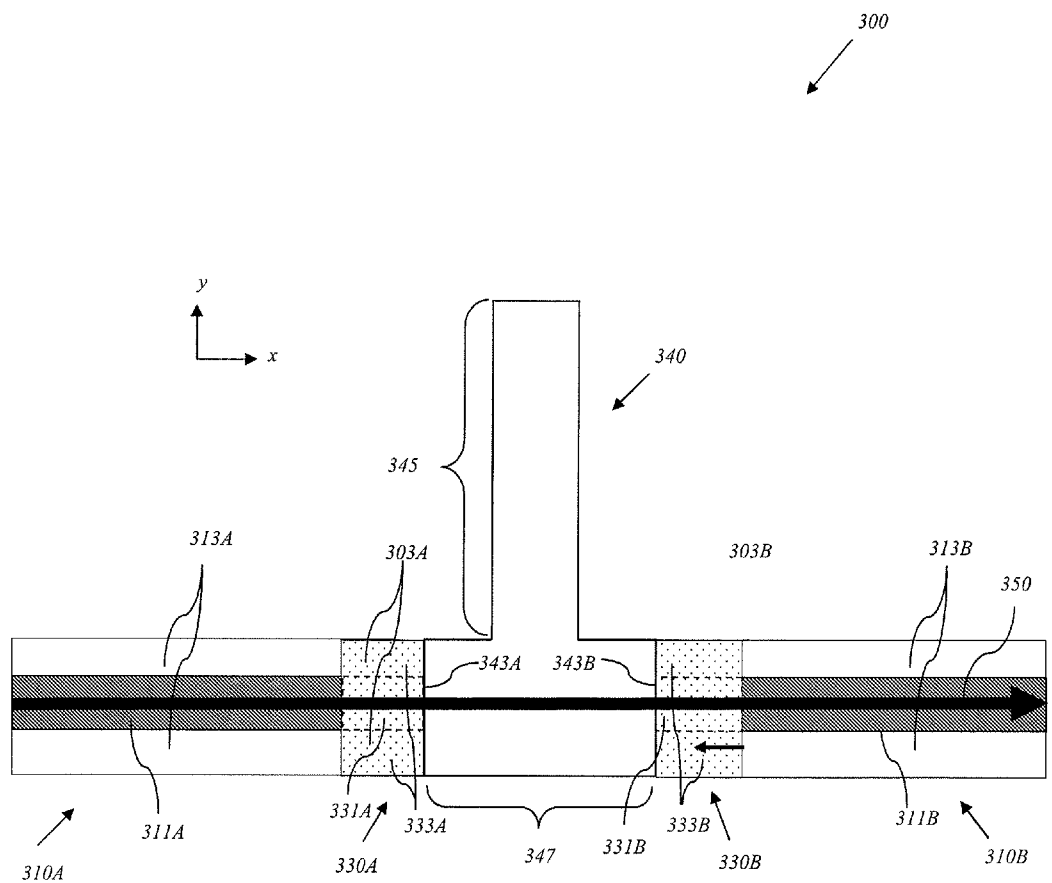
FIG. 3 is a cross-sectional view of an exemplary coupled optical system comprising two non-UV transmissive optical waveguides coupled via two SFWGs and a UV transmissive bridge.

FIG. 3 is a cross-sectional view of an exemplary coupled optical system 300 comprising two non-UV transmissive optical waveguides. The coupled optical system 300 includes a first optical waveguide 310A, a second optical waveguide 310B, a first self-forming waveguide (SFWG) 330A, a second SFWG 330B, and a UV bridge 340. The UV bridge 340 includes a bridge waveguide portion 347 and a UV input port portion 345. The first and second SFWGs 330A,B and the bridge waveguide portion 347 form a low-loss optical coupling between the two non-UV transmissive optical waveguides 310A,B.

In the illustrated example, the first and second optical waveguides 310A,B are optically transmissive, e.g., optical waveguides or fibers that are substantially transmissive at one or more wavelengths for which they are intended for normal operation (e.g., at the wavelength of the optical signal 350). However, in certain embodiments, one or both of the optical waveguides being coupled may be optical devices including, but are not limited to, electro-absorption modulators (EAMs), lasers, and filters. Some of the optical devices, however, may include waveguides or fibers that are non-UV transmissive. If both of the optical waveguides to be coupled by the SFWGs are non-UV transmissive, it impossible to propagate a UV "write" beam through either of the optical waveguides.

The bridge waveguide portion 347 includes a first port 343A and a second port 3438. The bridge waveguide portion 347 is both UV transmissive and transmissive for the wavelengths for optical signals intended to propagate between the two optical waveguides 310A,B. During normal operation, an optical signal 350 enters the bridge waveguide 347 via the first port 343A and exits the waveguide via the second port 343B. As will be described below with respect to FIG. 4, during formation of the first and second SFWGs 330A,B, an incident UV beam for writing the waveguides enters the UV bridge 340 via the UV input port portion 345 and directed or guided into the bridge waveguide portion 347 by a set of turning mirrors (not shown). At least a portion of the incident UV beam exits the UV bridge 340 via the first and second ports 343A,B into photosensitive materials to write SFWGs therein.

The first and second optical waveguides 310A,B may be disposed at certain separation distances (e.g., in the x direction) from the first and second ports 343A,B of the bridge waveguide 347. The separation distances, hence the widths (e.g., along x-direction) of the first and second SFWGs 330A, B, may be in the range of about 10 microns to about 2 millimeters. The widths are preferably between about 10 microns and about 100 microns. The length of the bridge waveguide portion 347 (e.g., in the x-direction) may be in the range of about 100 microns to about 10 millimeters. The length is preferably between about 500 microns to about 2 millimeter.

Each of the first and second optical waveguides 310A,B includes a core region 311A,B and a cladding region 313A,B that surrounds the core region. The core and cladding regions of each waveguide differ in refractive index such that light energy may be confined within and efficiently transmitted through the respective core region by refraction from the surrounding cladding region.

It shall be appreciated that the coupled optical system 300 shown in FIG. 3 is for illustration purposes only and various other embodiments that are within the scope of the present disclosure are possible. For example, although the first and second optical waveguides 310A,B are shown in FIG. 3 to have the same diameter, the two optical waveguides may have different diameters. In some embodiments, the cladding regions 313A,B may include two or more concentric cladding regions having different refractive indices. Although the UV bridge 340 in the illustrated example is shaped like a "T" with the UV input port portion 345 joining the bridge waveguide portion 347 at a right angle, these two portions may be joined at a non-right angle. In some embodiments, the UV input portion 345 may be removed after the SFWGs 330A,B are formed. In other embodiments, the UV bridge 340 may not include a UV input portion from the start. Instead, the UV bridge 340 may comprise only a bridge waveguide portion shaped like a cylinder or a rectangular bar. A UV beam can be coupled into the bridge waveguide portion by focusing the UV beam onto one or more sides of the bridge waveguide or by evanescently coupling the UV beam from another waveguide having the same resonance brought in close proximity (e.g., less than 1 μm) to the bridge waveguide.

Each of the SFWGs 330A,B includes an inner region 331A,B and an outer region 333A,B. The inner regions 331A,B are aligned with the core regions 311A,B of the optical waveguides 310A,B, while the outer regions 133A,B are aligned with the cladding regions 313A,B of the optical waveguides. For a confinement of the optical signal 350, the refractive index in each of the inner regions 331A,B is made to be higher than the refractive index of each of the corresponding outer regions 333A,B by UV illumination of a photosensitive material via a UV bridge as described below with respect to FIG. 4. The photosensitive material can be a composite material comprising a polymerized binder material having a compatible, high-mobility, reactive monomer component and a photo catalyst.

Figure 4:
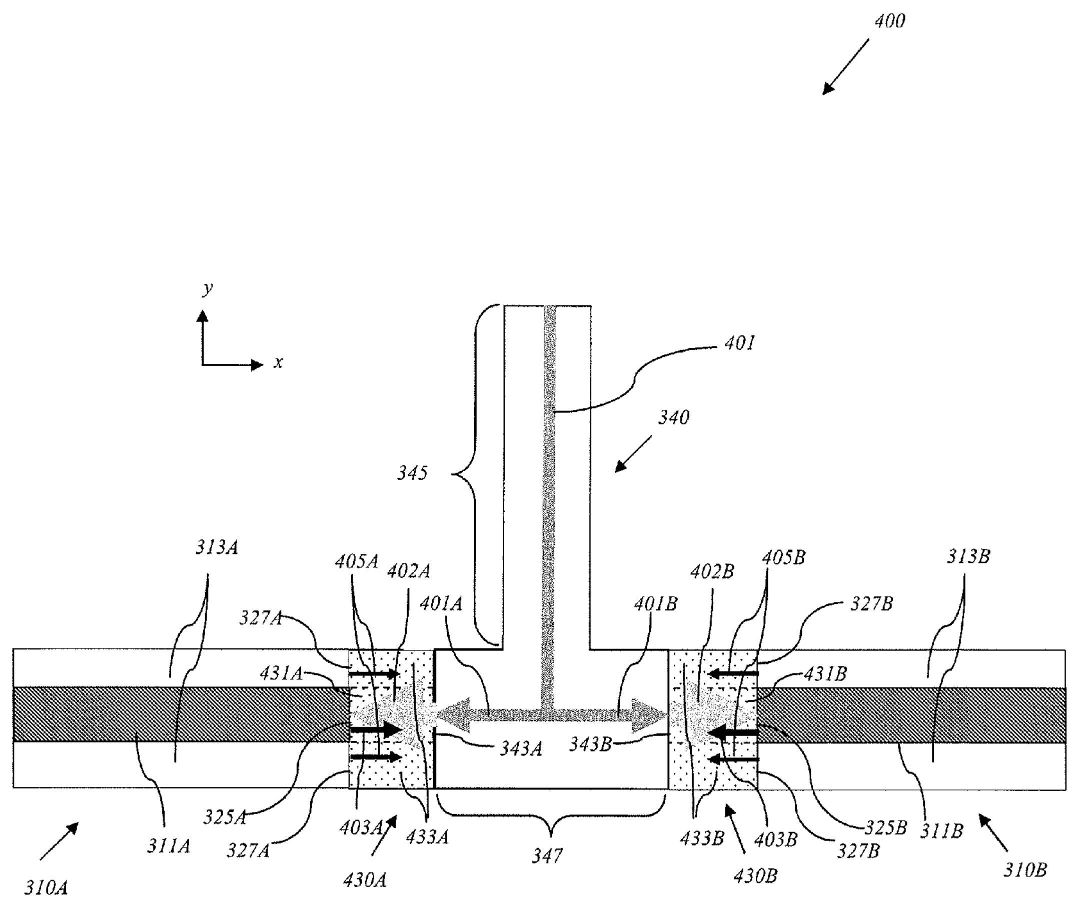
FIG. 4 is a cross-sectional view of an exemplary coupled optical system illustrating formation of SFWGs by the use of a UV transmissive bridge according to certain embodiments.

A new and novel methodology that can provide for one or more SFWGs between two non-UV transmissive optical waveguides is now described. As described above, prior art methodologies for forming SFWG optical couplings involved the UV illumination of a photosensitive polymer from both of two previously-aligned waveguides. Therefore, the prior art methodologies based on two-sided UV illumination cannot be used to form an optically coupled system, such as the coupled optical system 300 shown in FIG. 3, in which the two optical waveguides being coupled are both non-UV transmissive. FIG. 4 is a cross-sectional view of an exemplary coupled optical system 400 illustrating formation of SFWGs, such as the SFWGs 330A,B, by the use of a UV bridge according to certain embodiments. The coupled optical system 400 is substantially the same as the coupled optical system 300 shown in FIG. 3, except that the SFWGs 330A,B are being formed in photosensitive materials 430A,B by a UV illumination via the UV bridge 340. The photosensitive materials 430A,B, after the UV exposure, turn into SFWGs such as the SFWGs 330A,B shown in FIG. 3.

Each of the first and second optical waveguides 310A,B includes a first or inner facet 325A,B and a second or outer facet 327A,B. The inner facet 325A,B forms a boundary or interface between the core region 311A,B and the photosensitive material 430A,B, while the second facet 327A,B forms a boundary or interface between the outer cladding region 313A,B and the photosensitive material 430A,B, respectively. In certain embodiments, the photosensitive material 430A,B may include a composite mixture comprising a polymer and a monomer. In some of such embodiments, the mixture can include an acrylic copolymer binder blended with a cycloaliphatic diepoxide monomer.

Initially, an incident UV beam 401 enters the UV bridge 340 via the UV input port portion 345 and, after being directed through the UV input portion 345 by a set of turning mirrors (not shown), gets coupled to the bridge waveguide portion 347 to form two generally oppositely-travelling UV beams 401A,B (e.g., along the +/− x directions). The UV beams 401A,B exit the bridge waveguide portion 347 via the first and second ports 343A,B and enter the photosensitive materials 430A,B. The UV beams after entering the photosensitive materials diverge to form diverged UV beams 402A, B. Certain portions of the diverged UV beams 402A,B are reflected at the inner facets 325A,B and other portion are reflected at the outer facets 327A,B to form inner reflected light beams 403A,B and outer reflected light beams 405A,B, respectively.

Similar to what was described above with respect to FIG. 2, the inner reflected UV beams 403A,B are used as "secondary" UV beams for writing the respective SFWGs. For example, the inner reflected UV beam 403A polymerizes at least a portion of the photosensitive material in the first photosensitive material 430A to write a self-forming waveguide (e.g., the SFWG 330A of FIG. 3) there. Similarly, the inner reflected UV beam 403B polymerizes at least a portion of the photosensitive material in the second photosensitive material 430B to write another self-forming waveguide (e.g., the SFWG 330B) there.

In certain embodiments, the core region 311A,B of each optical waveguide 310A,B has a higher refractive index than the respective cladding region 313A,B. As explained above with respect to FIG. 2, the difference in refractive index of the core region and the cladding region provides the different intensities in the reflected UV beams which in turn form inner regions 431A, B and outer regions 433A,B of different refractive indices required of waveguides, such as, for example, the SFWGs 330A,B of FIG. 3.

In summary, the presently disclosed methodology is well suited for use in forming a SFWG in a photosensitive material for providing an optical coupling between two optical waveguides. The disclosed methodology allow for formation of a SFWG where one or both of the optical waveguides being coupled cannot support a UV beam to pass through two oppositely travelling UV beams into the photosensitive material as done in prior art methodologies.

In the previous description, numerous specific details are set forth, such as specific materials, structures, processes, etc., in order to provide a better understanding of the present disclosure. However, the present disclosure can be practiced without resorting to the details specifically set forth herein. In other instances, well-known processing techniques and instrumentalities have not been described in order not to unnecessarily obscure the present disclosure.

Only the preferred embodiments of the present disclosure and but a few examples of its versatility are shown and described herein. It is to be understood that the present disclosure is capable of use in various other combinations and environments and is susceptible of changes and/or modifications within the scope of the inventive concept as expressed herein.

The foregoing description is provided to enable any person skilled in the art to practice the various embodiments described herein. While the foregoing embodiments have been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art in view of the present disclosure, and generic principles defined herein may be applied to other embodiments. Thus, many changes and modifications may be made to the invention, by one having ordinary skill in the art in view of the present disclosure, without departing from the spirit and scope of the invention.

A reference to an element in the singular is not intended to mean “one and only one” unless specifically stated, but rather “one or more.” The term “some” refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A coupled optical system comprising:

a UV transmissive optical waveguide;

a non-UV transmissive optical waveguide;

a self-forming waveguide (SFWG) disposed between the UV transmissive optical waveguide and the non-UV transmissive optical waveguide; and wherein the SFWG comprises an inner region and an outer region surrounding at least part of the inner region, the inner region having a higher refractive index than the outer region.

2. The coupled optical system according to claim 1, wherein the inner region has the higher refractive index as a result of having received a higher amount of UV exposure than the outer region during formation of the SFWG.

3. The coupled optical system according to claim 2, wherein the non-transmissive optical waveguide includes a core region terminating at an inner facet and a cladding region terminating at an outer facet, the SFWG having been formed at least in part by a UV beam reflected from the inner facet.

4. The coupled optical system according to claim 1, wherein a separation distance between the UV transmissive optical waveguide and the non-UV transmissive optical waveguide is in the range between about 10 microns to about 100 microns.

5. The coupled optical system according to claim 1, wherein the UV transmissive optical waveguide and the non-UV transmissive optical waveguide are transmissive to signals of interest.

6. The coupled optical system according to claim 1, wherein the non-UV transmissive optical waveguide is an electro-absorption modulator (EAM), a laser, or a filter.

7. The coupled optical system according to claim 1, wherein the SFWG allows an optical signal to pass between the UV transmissive optical waveguide and the non-UV transmissive optical waveguide with coupling losses no more than about 0.5 dB.

8. A coupled optical system comprising:

a first non-ultraviolet (UV) transmissive optical waveguide;

a second non-UV transmissive optical waveguide;

a UV transmissive bridge comprising a bridge waveguide disposed between the first and second optical waveguides;

a first self-forming waveguide (SFWG) disposed between the bridge waveguide and the first optical waveguide, wherein the first SFWG comprises a first inner region and a first outer region surrounding at least part of the first inner region, the first inner region having a higher refractive index than the first outer region; and a second SFWG disposed between the bridge waveguide and the second optical waveguide, wherein the second SFWG comprises a second inner region and a second outer region surrounding at least part of the second inner region, the second inner region having a higher refractive index than the second outer region.

9. The coupled optical system according to claim 8, wherein at least one of the first and second inner regions has the higher refractive relative to the corresponding first or second outer region index.

10. The coupled optical system according to claim 8, wherein a separation distance between each of the first and second optical waveguides and the bridge waveguide is in the range between about 10 microns to about 100 microns.

11. The coupled optical system according to claim 8, wherein the first and second optical waveguides are non-UV transmissive optical waveguides.

12. The coupled optical system according to claim 8, wherein at least one of the first and second optical waveguides is an electro-absorption modulator (EAM), a laser, or a filter.

13. The coupled optical system according to claim 8, wherein the UV transmissive bridge further comprises a UV input port for receiving an incident UV beam during formation of the first and second SFWGs.

* * * * *

UNITED STATES PATENT AND TRADEMARK OFFICE

CERTIFICATE OF CORRECTION

PATENT NO. : 7,949,219 B1
APPLICATION NO. : 12/398967
DATED : May 24, 2011
INVENTOR(S) : Karras It is certified that error appears in the above-identified patent and that said Letters Patent is hereby corrected as shown below:

IN THE SPECIFICATION:

In Column 8, Line 58: Replace “3438”, with -- 343B --

Signed and Sealed this
Twenty-second Day of November, 2011

David J. Kappos
*Director of the United States Patent and Trademark Office*